United States Patent [19]

Kennedy et al.

[11] E Patent Number: Re. 32,871

[45] Reissued Date of Patent: Feb. 21, 1989

[54] MINE STOPPING

[76] Inventors: William R. Kennedy; John M. Kennedy, both of P.O. Box 38, Taylorville, Ill. 62568

[21] Appl. No.: 92,227

[22] Filed: Sep. 2, 1987

Related U.S. Patent Documents

Reissue of:

[64] Patent No.: 4,547,094
Issued: Oct. 15, 1985
Appl. No.: 574,984
Filed: Jan. 30, 1984

[51] Int. Cl.[4] ..... E21F 1/14
[52] U.S. Cl. ..... 405/132
[58] Field of Search ..... 405/132, 146, 150, 288, 405/303; 98/50; 299/12

[56] References Cited

U.S. PATENT DOCUMENTS

| | | | |
|---|---|---|---|
| 1,594,921 | 8/1926 | Barnett | 405/132 |
| 2,729,064 | 1/1956 | Kennedy et al. | 405/132 |
| 2,729,065 | 1/1956 | Craggs et al. | 405/132 |
| 3,302,343 | 2/1967 | Bear | 405/132 X |

*Primary Examiner*—David H. Corbin
*Attorney, Agent, or Firm*—Senniger, Powers, Leavitt and Roedel

[57] ABSTRACT

A mine stopping comprising a plurality of elongate extensible panels extending vertically from the floor to the roof of a passage in a mine. The panels impede the flow of air through the passageway except for a space at a side of the passageway because of irregularity of the side of the passageway. The stopping further has means for impeding the flow of air through the space comprising at least one side extension for the stopping. The side extension comprises a bar and a relatively long and narrow plate secured to the bar with a portion of the bar projecting from one end of the plate constituting its inner end. The extension is mounted on one face of the stopping extending generally horizontally with the plate in a generally vertical plane and extends into the space for blocking it. The projecting portion of the bar lies against the face of the stopping and has means for securing the projecting portion of the bar to the stopping.

14 Claims, 1 Drawing Sheet

MINE STOPPING

Matter enclosed in heavy brackets [ ] appears in the original patent but forms no part of this reissue specification; matter printed in italics indicates the additions made by reissue.

BACKGROUND OF THE INVENTION

This invention relates to mine stoppings, and more particularly to side extension means for a mine stopping, the stopping comprising a plurality of vertically extending extensible and contractible metal panels.

So called mine "stoppings" are widely used in mines to stop off the flow of air in passages in the mines, a stopping generally being installed at the entrance of a passage to block the flow of air therethrough. One type of mine stopping that is widely used is a type made of extensible and contractible panels which extend generally vertically from the floor to the roof of the passageway. Reference may here be made to U.S. Pat. No. 2,729,064 issued Jan. 3, 1956. However, a problem has been encountered in using this type of stopping at a location in the mine where there is rock or other material at a side of the passageway which is off vertical or irregular and not readily trimmed with a pick to make it relatively vertical and regular resulting in the problem of space or spaces between the stopping panels and the side of the passageway, which need to be blocked for effective stopping.

SUMMARY OF THE INVENTION

Among the several objects of this invention may be noted the provision of a mine stopping made up of generally vertically extending contractible and extensible panels with side extension means for blocking space between the stopping panels and a side of the passageway in which the stopping is used; the provision of such means which does not interfere with the extensibility and contractibility of the stopping panels; and the provision of such means which, while being effective for its purpose, is of simple and economical construction.

In general, the invention involves a mine stopping comprising a plurality of elongate extensible panels extending vertically from the floor to the roof of a passageway in a mine. The panels impede the flow of air through the passageway except for a space at the side of the passageway because of irregularity of the side of the passageway. The stopping further has means for impeding the flow of air through the space comprising at least one side extension for the stopping. The side extension comprises a bar and a relatively long and narrow plate secured to the bar with a portion of the bar projecting from one end of the plate, constituting its inner end. The extension is mounted on one face of the stopping extending generally horizontally, with the plate in a generally vertical plane and extending into the space for blocking the space. The projecting portion of the bar lies against the face of the stopping and has means for securing the projecting portion of the bar to the stopping.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 4:
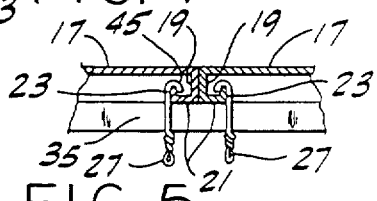
FIG. 4 is an enlarged horizontal section on line 4—4 of FIG. 1.
Figure 5:
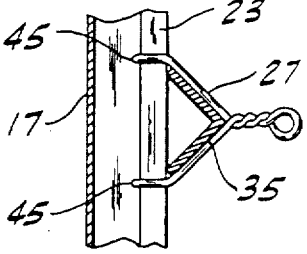
FIG. 5 is an enlarged section showing a bar secured by a wire twist tie.

Referring to the drawings, there is generally indicated at 1 a mine stopping installed in a passageway P in a mine having side extensions 3 of this invention for blocking spaces 5 at the side of the passageway. The stopping comprises a plurality of elongate panels 7 extending generally vertically in side-by-side relation from the floor 9 to the roof 11 of the passageway. Each of the panels 7 comprises a first elongate member 13 constituting a lower member of the panel 7 adapted for engagement of its lower end with the floor 9 of the passageway and a second elongate member 15 constituting an upper member of the panel 7 adapted for engagement of its upper end with the roof 11 of the passageway. Each of the panel members 13 and 15 is a sheet metal member of channel shape in cross-section having a web 17 and flange 19 at opposite sides of the web (see FIG. 4). Each flange 19 has an inturned portion 21 at its outer edge extending generally parallel to the web 17 and a lip 23 at the inner edge of the inturned portion extending toward the web 17. The upper panel member 15 has a telescoping fit in the respective lower panel member 13, the webs 17 of the members being in sliding engagement. Bars 25 extend substantially horizontally between the sides of the passageway P and are secured to panels 7 of the stopping by wire twist ties 27 which are hooked to lips 23. Normally, a plurality of the panels 7 are installed in the passageway P from one side thereof to the other with the side flanges 19 of one panel member in engagement with the side flanges 19 of the adjacent panel member. In some instances, the width of the passageway is such that a lapover panel 29 is necessary to block a space that results between panels 9, as will be understood by those skilled in the art. In other instances, a side of the passageway is composed of a rock band or other material that is not pick responsive, resulting in a space or spaces 5 between the end panel of the stopping and the side of the passageway, due to the irregular face along that side of the passageway.

In order to close such a space 5, side extensions 3, constituting means for impeding the flow of air through the space, are mounted on one face of the stopping. Each side extension 3 comprises a bar 31 and a relatively long and narrow plate 33 suitably secured (e.g. welded) to the bar generally along the center of the plate with a portion of the bar 35 projecting from one end of the plate 33 constituting its inner end. The bar 31, as shown in FIGS. 2 and 3, is a length of angle iron similar to bar 25 as will be familiar to those knowledgable with the art.

Figure 1:
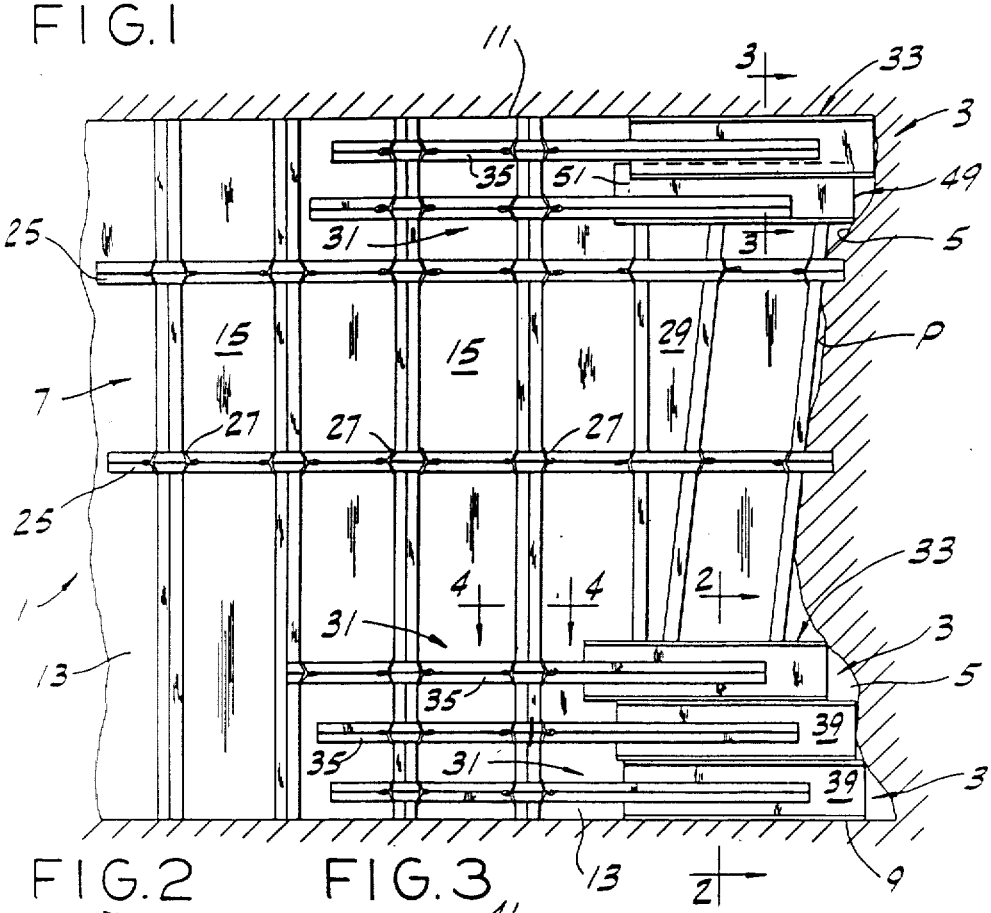
FIG. 1 is a front elevation of a mine stopping in a passageway in a mine having side extension means of this invention installed thereon.
Figure 2:
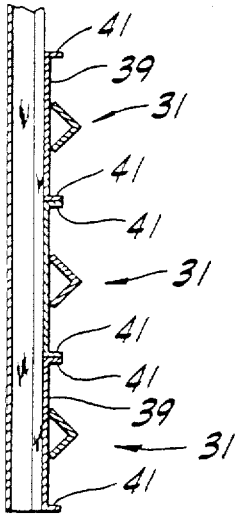
FIG. 2 is an enlarged vertical section on line 2—2 of FIG. 1.
Figure 3:
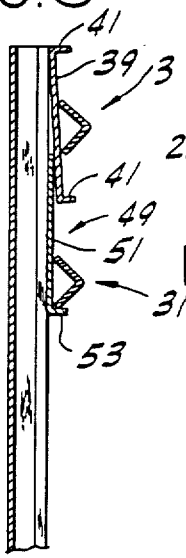
FIG. 3 is an enlarged vertical section on line 3—3 of FIG. 1.

The plate 33 of a typical side extension 3 is made from sheet metal or the like and is of channel shape in cross-section having a web 39 and flanges 41 at opposite sides of the web (see FIG. 2). The extensions 3 are mounted so that they extend generally horizontally and in a generally vertical plane with respect to the stopping 1 and further extend into the space 5 for blocking it. The side flanges 41 of the extensions 3 are in engagement with the side flanges 41 of the adjacent extensions 3 as shown in FIG. 2. The extensions 3 are held in place, wire ties 43, originally of generally U-shape, of the same type as used for securing bars 25 to panels 7, constituting means for securing the projecting portion 35 of the bar. Each tie 43 has a hook 45 at each end engageable with one of the main panels 9 and a central portion 47 adapted to be twisted so as to deform the tie 43 around the portion of bar 35 and draw the bar to the main panel. As particularly shown in FIG. 1, the projecting portion 35 of each bar has a tie at each lip 23 of each panel it contacts.

In instances where a whole number (i.e. 1, 2 or 3, etc.) of extensions 3 will not satisfactorily cover the particular space, one or more lapover side extensions 49 may be used. Such an extension, as appears in FIGS. 1 and 3, is similar to extension 3 in that it is a metal plate having a web 51. However, it only has one flange 53 as opposed to the two flanges 41 of extension 3. This allows for the overlapping of the extensions 3 and 49 as shown best in FIG. 3. Moreover, the bar 31 of extension 49 is not necessarily placed in the center web 51 but is secured thereto where it will not interfere with extension 3 overlapping web 51. Extension 49 is secured to the face of the stopping in the same manner as described above for extension 3.

It will be observed that the clamping of the bar 35 to one face of the stopping by means of wire twist ties 43 does not hinder either the contractibility or extensibility of the panel members 13 of the mine stopping.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A mine stopping comprising a plurality of elongate extensible panels extending vertically from the floor to the roof of a passageway in a mine, each panel comprising upper and lower panel members each of channel shape in cross section having a web and flanges at opposite sides of the web, one of the members having a sliding fit in the other with the flanges extending toward one face of the stopping, said panels impeding flow of air through the passageway except for a space at a side of the passageway because of irregularity of the side of the passageway, and means for impeding flow of air through said space comprising at least one side extension for the stopping, said side extension comprising a bar and a relatively long and narrow plate secured to the bar with a portion of the bar projecting from one end of the plate constituting its inner end;

said extension being mounted on said one face of the stopping extending generally horizontally with said plate in a generally vertical plane and extending into said space for blocking said space;

said projecting portion of the bar lying against flanges of certain of said members and means for securing said projecting portion of the bar to said flanges.

2. A mine stopping as set forth in claim 1 wherein said flanges have inturned portions and said securing means comprises a wire twist tie extending around said projecting portion of the bar hooked to said inturned portions and adapted to draw the bar against said face of the stopping.

3. A mine stopping as set forth in claim 1 comprising a plurality of extensions, one above another.

4. A mine stopping as set forth in claim 3 wherein each extension is of channel shape in cross-section thereby having a web and flanges at opposite sides of the web.

5. A mine stopping as set forth in claim 4 wherein the flanges of adjacent extensions are in engagement.

6. A mine stopping as set forth in claim 4 comprising a plurality of lapping extensions.

7. A mine stopping as set forth in claim 6 wherein each of said lapping extensions comprises a plate having a web portion and a flange along one edge of the web, the flanges extending outwardly with respect to the stopping and the webs of adjacent flanges being in engagement.

*8. A mine stopping comprising a plurality of elongate extensible panels extending vertically from the floor to the roof of a passageway in a mine, each panel comprising upper and lower panel members each of channel shape in cross section having a web and flanges at opposite sides of the web, one of the members having a sliding fit in the other with the flanges extending toward one face of the stopping, said panels impeding flow of air through the passageway except for a space at a side of the passageway because of irregularity of the side of the passageway, and means for impeding flow of air through said space comprising at least one side extension for the stopping, said side extension comprising a bar and a plate secured to the bar with a portion of the bar projecting from one end of the plate constituting its inner end, said extension being mounted on said one face of the stopping extending generally horizontally with said plate in a generally vertical plane and extending into said space for blocking said space, said projecting portion of the bar lying against flanges of certain of said members, and means for securing said projecting portion of the bar to said flanges.*

*9. A mine stopping as set forth in claim 8 wherein said flanges have inturned portions and said securing means comprises a wire twist tie extending around said projecting portion of the bar hooked to said inturned portions and adapted to draw the bar against said face of the stopping.*

*10. A mine stopping as set forth in claim 8 comprising a plurality of extensions, one above another.*

*11. A mine stopping as set forth in claim 10 wherein each extension is of channel shape in cross-section thereby having a web and flanges at opposite sides of the web.*

*12. A mine stopping as set forth in claim 11 wherein the flanges of adjacent extensions are in engagement.*

*13. A mine stopping as set forth in claim 11 comprising a plurality of lapping extensions.*

*14. A mine stopping as set forth in claim 13 wherein each of said lapping extensions comprises a plate having a web portion and a flange along one edge of the web, the flanges extending outwardly with respect to the stopping and the webs of adjacent flanges being in engagement.*

* * * * *